US012409477B2

(12) United States Patent
Loades

(10) Patent No.: US 12,409,477 B2
(45) Date of Patent: Sep. 9, 2025

(54) PIPE CLEANING DEVICE

(71) Applicant: ATAM GROUP LIMITED, Great Yarmouth (GB)

(72) Inventor: Mark Loades, Great Yarmouth (GB)

(73) Assignee: ATAM Group Limited, Norfolk (GB)

( * ) Notice: Subject to any disclaimer, the term of this patent is extended or adjusted under 35 U.S.C. 154(b) by 324 days.

(21) Appl. No.: 16/346,278

(22) PCT Filed: Nov. 1, 2017

(86) PCT No.: PCT/GB2017/053284

§ 371 (c)(1),
(2) Date: Apr. 30, 2019

(87) PCT Pub. No.: WO2018/083462

PCT Pub. Date: May 11, 2018

(65) Prior Publication Data

US 2020/0179995 A1 Jun. 11, 2020

(30) Foreign Application Priority Data

Nov. 1, 2016 (GB) ..................................... 1618433
Mar. 1, 2017 (GB) ..................................... 1703318
Jul. 24, 2017 (GB) ..................................... 1711852

(51) Int. Cl.
*B08B 9/043* (2006.01)
*B08B 9/049* (2006.01)
*E03F 9/00* (2006.01)

(52) U.S. Cl.
CPC .......... *B08B 9/0433* (2013.01); *B08B 9/0495* (2013.01); *E03F 9/002* (2013.01); *B08B 2209/04* (2013.01)

(58) Field of Classification Search
CPC . B08B 9/0433; B08B 9/0495; B08B 2209/04; B08B 9/03; B08B 9/0558;
(Continued)

(56) References Cited

U.S. PATENT DOCUMENTS 4,651,558 A 3/1987 Martin et al.
4,800,104 A * 1/1989 Cruickshank ........... B08B 9/057 427/230
(Continued)

FOREIGN PATENT DOCUMENTS

CA 2 500 048 A1 9/2006
DE 3614046 A1 * 11/1986
(Continued)

OTHER PUBLICATIONS

Translation of de3614046a1 (Year: 1986).*
(Continued)

*Primary Examiner* — Tom Rodgers
(74) *Attorney, Agent, or Firm* — Workman Nydegger

(57) ABSTRACT

A device for cleaning the internal surface of a pipe has a main pipe axis. The device further includes one or more generally tubular conduits, including a conduit wall, at least one of the or each tubular conduit including an inlet to receive pressurised gas into the tubular conduit. One or more nozzles is deployed around the outside of the or each tubular conduit, with the or each nozzle being in fluid connection with the tubular conduit. At least one nozzle is directed at least partially to direct fluid in a direction non-perpendicular to the main tubular conduit axis, with one or more spacer elements to hold the or each tubular conduit in spaced relationship to a pipe.

12 Claims, 10 Drawing Sheets

(58) Field of Classification Search
CPC . B08B 9/027; F16L 55/36; F28G 1/12; F28G 1/16; F28G 1/163; H04N 5/2252
USPC .............................. 15/339, 104.05, 406–408
See application file for complete search history.

(56) References Cited

U.S. PATENT DOCUMENTS

| | | | | |
|---|---|---|---|---|
| 5,942,044 | A | 8/1999 | Piguillet | |
| 6,138,697 | A * | 10/2000 | Horger | E03F 7/12 134/167 C |
| 6,523,554 | B1 | 2/2003 | Bryant | |
| 6,676,041 | B1 | 1/2004 | Mcloughlin et al. | |
| 6,686,950 | B1 | 2/2004 | Caffon et al. | |
| 8,707,498 | B2 * | 4/2014 | Crawford | B08B 9/0557 134/167 C |
| 2002/0102136 | A1 | 8/2002 | Holland | |
| 2006/0266134 | A1 * | 11/2006 | MacMillan | F16L 55/30 73/865.8 |
| 2008/0072963 | A1 | 3/2008 | Strohmeier et al. | |
| 2009/0188568 | A1 | 7/2009 | Malka | |
| 2010/0209606 | A1 | 8/2010 | Munden | |
| 2014/0285656 | A1 * | 9/2014 | Zink | H04N 5/2252 348/84 |
| 2014/0345651 | A1 | 11/2014 | MacKenzie | |
| 2016/0314329 | A1 | 10/2016 | Papazian | |
| 2016/0341320 | A1 | 11/2016 | Taylor | |
| 2018/0038093 | A1 | 2/2018 | Olsson | |

FOREIGN PATENT DOCUMENTS

| | | | | |
|---|---|---|---|---|
| DE | 4426708 | A1 | 2/1996 | |
| DE | 19619326 | A1 | 11/1997 | |
| DE | 102009025701 | A1 | 12/2010 | |
| DE | 102009057284 | A1 * | 6/2011 | B08B 9/0495 |
| DE | 20 2014 000129 | U1 | 4/2014 | |
| DE | 102017125733 | A1 | 5/2019 | |
| EP | 3 144 593 | A1 | 3/2017 | |
| FR | 1 345 106 | A | 12/1963 | |
| FR | 2 768 214 | A1 | 3/1999 | |
| GB | 2276927 | | 10/1994 | |
| GB | 2 332 032 | A | 6/1999 | |
| KR | 970005750 | Y1 * | 6/1997 | |
| SU | 671 883 | A1 | 7/1979 | |
| WO | 2018/083462 | A1 | 5/2018 | |

OTHER PUBLICATIONS

Translation of de102009057284a1 (Year: 2011).*
Translation of KR-970005750-Y1 (Year: 1997).*
Search Report dated Mar. 30, 2017, issued in GB 1618433.5.
International Search Report dated Feb. 12, 2018, issued in PCT Application No. PCT/GB2017/053284, filed Nov. 1, 2017.
Written Opinion dated Feb. 12, 2018, issued in PCT Application No. PCT/GB2017/053284, filed Nov. 1, 2017.

* cited by examiner

PIPE CLEANING DEVICE

FIELD OF THE INVENTION

The invention relates to a device to dewater or clean the internal surface of a pipe or the like. The device acts to dry or to urge water dust, debris and the like out of the pipe or a piping system.

BACKGROUND TO THE INVENTION

Pipes of all sizes and uses, including pipes for gas and also pipes for liquids, which pipes are, often, as particularly contemplated in the current invention, located above ground, encounter difficulties with cleanliness due to build up of debris within the pipes in areas which are hard to reach due to the length of the pipes. The problem is particularly encountered when constructing a pipeline or process piping system from pipe sections, during which pipe sections are joined together, typically by welding. Debris either from the joining process, left behind by an operative or simply blown in from the outside environment can accumulate within the pipeline.

Existing cleaning and inspection methods include using water jets with hydro jetting nozzles which are currently used to attempt cleaning of pipes with the use of water. These operate under water pressure supplied via a high-pressure fluid pump and work by supplying a jet stream of water to a cylindrical nozzle which rotates inside the pipe and, as the nozzle is removed from the pipe, flushes the debris from the pipe opening. However, these devices can cause various problems where oxidation and corrosion from water left in the pipes has caused damage to the pipes, resulting in expensive costs of running and environmental issues as welding materials can be washed into the soil or water course. There is also a need to subsequently dry the pipe internally before use.

Current practices waste time, money and precious water reserves. Large expensive equipment and operators are also required to carry out pipe cleaning, drying and inspection processes.

Utilising device and process of the current invention, allows use of these long and drawn out processes to be obviated. The combined technologies and efficient procedure offered by using the device and process, enable the construction of process piping systems whilst inspecting, cleaning and drying consecutively.

The inspection process and method has until now been impossible to implement due to the necessity of introducing water internally to the pipework.

The current industry process for piping system and pipeline cleaning, drying and inspection process currently operates in the stages described below in bullet point.

- Spools lifted into place and position on pipe stands
- Spool pieces offered up and tacked in place with bullets to supply even space for welding
- Root pass weld applied between bullets
- Remove first bullet with grinder
- Grind edge of first weld to present leading edge of second weld
- Repeat above two stages until weld is complete
- Repeat above stages until process piping system is fully constructed
- System or part system hydro test commences
- Test completed system or part system de-watered
- System awaits pre-commissioning/commissioning inspection prior to final walk downs/punch listing

- Debris and possible oxidation found during camera inspection
- Systems determined unfit for start-up due to debris accumulation and possible oxidation
- Systems handed over to service company to internally camera inspect as fully as possible and furnish hydro jetting/cleaning teams to location of debris pockets
- Systems hydro jetted to try and remove debris
- Await for hydro jetting water vapour to settle
- System handed back to camera inspection team
- Possibly repeat three above stages several times
- Remove remaining hydro jetting water from system by dropping out of valves and spools to allow access for de-watering procedures
- Reinstall valves and spool
- Connect drying equipment to allow remaining water pockets to evaporate
- Assess damage caused to carbon steel pipework through water and debris contamination
- Possibly conduct chemical cleaning operations depending on oxidisation damage
- Hand system to client for commissioning phase The present invention seeks to address the above problems and provide a device which can act to urge solid materials from a pipe.

SUMMARY OF THE INVENTION

According to a first aspect of the invention, there is provided a device for cleaning the internal surface of a pipe having a main pipe axis, the device including:

- one or more generally tubular conduits, including a conduit wall, at least one of the or each tubular conduits including an inlet to receive pressurised gas into the tubular conduit,
- one or more nozzles deployed around the outside of the or each conduit, the or each nozzle being in fluid connection with a tubular conduit,
- at least one nozzle directed at least partially to direct fluid in a direction non-perpendicular to the conduit axis of the tubular conduit with which it is in fluid connection,
- one or more spacer elements to hold the or each tubular conduit in spaced relationship to a pipe, to protect the or each conduit during use and with the or each directed nozzle acting to impel debris within a pipe, along a main pipe axis.

Preferably, the device includes a camera head to provide images of the inside of a pipe, the camera head further preferably being connected via a data cable to a data receiver, and a power source via a power cable, allowing images to be transmitted to an operator, and enabling the operator to determine the internal status of the pipe.

Optionally the device includes an atrium body to house the data and power cables to the camera head and protect these from abrasion. The device further optionally includes a capacitor deployed between the power supply and the camera head to protect the capacitor from spikes in electrical current, said capacitor being housed within the atrium body.

Optionally the atrium body is tubular, with the or each tubular conduit secured to the outside of the atrium body. Further optionally, the tubular conduit is deployed concentrically and coaxially around the atrium body.

Preferably, the device includes a plurality of conduits, each conduit being fluidly linked to the air supply. Alternatively, each conduit is fluidly linked to its own air supply to allow concentration of pressurised air to be directed to a particular region.

Preferably, at least one nozzle is directed onto the camera head, to assist in keeping the camera head clean.

Optionally, the or each spacer element is a leg, the leg secured at a first end to the body and extending away from the device, the legs co-operating together to support on their respective second ends, the tubular conduit in spaced relationship to the inner pipe wall. Further preferably, each second end of each leg has a wheel to assist in moving the device along a pipe. Yet further optionally, the device includes eight legs the second end of each being at the corner of a cube or rectangular cuboid which enables the device to be used in any orientation in the event that the device tips over during use.

Alternatively or additionally optionally, the spacer element includes a cage to minimise damage to the device during use, which cage is further optionally in two parts releasably securable together to ease maintenance of the device.

BRIEF DESCRIPTION OF THE DRAWINGS

Embodiments of the invention will now be described, by way of example only, with respect to the following drawings. In the drawings.

DETAILED DESCRIPTION OF THE EMBODIMENTS

The invention provides an air jetting tool, particularly for use in cleaning, drying and the inspection of internal piping systems of varying sizes. It is envisioned that the air jetting tool can be used to clean pipes ranging in diameter from 5 cm to 160 cm and including above-land pipes and below sea pipes. The tools in all embodiments are suitable for use in pipe works and spools formed of a range of materials such as carbon steel, stainless steel, titanium, duplex or a plastics material. During the construction of pipes, debris can accumulate within the pipeline. Although this debris is not physically attached to the internal wall of the pipeline it needs to be removed before use as the debris could contaminate the fluid flowing through the pipeline and also cause damage to pumps which cause the fluid to flow. Moreover, care has to be taken when cleaning the debris from the pipeline as some of the debris can be hazardous to the environment and so needs to be collected as it exits the pipeline.

Figure 1:
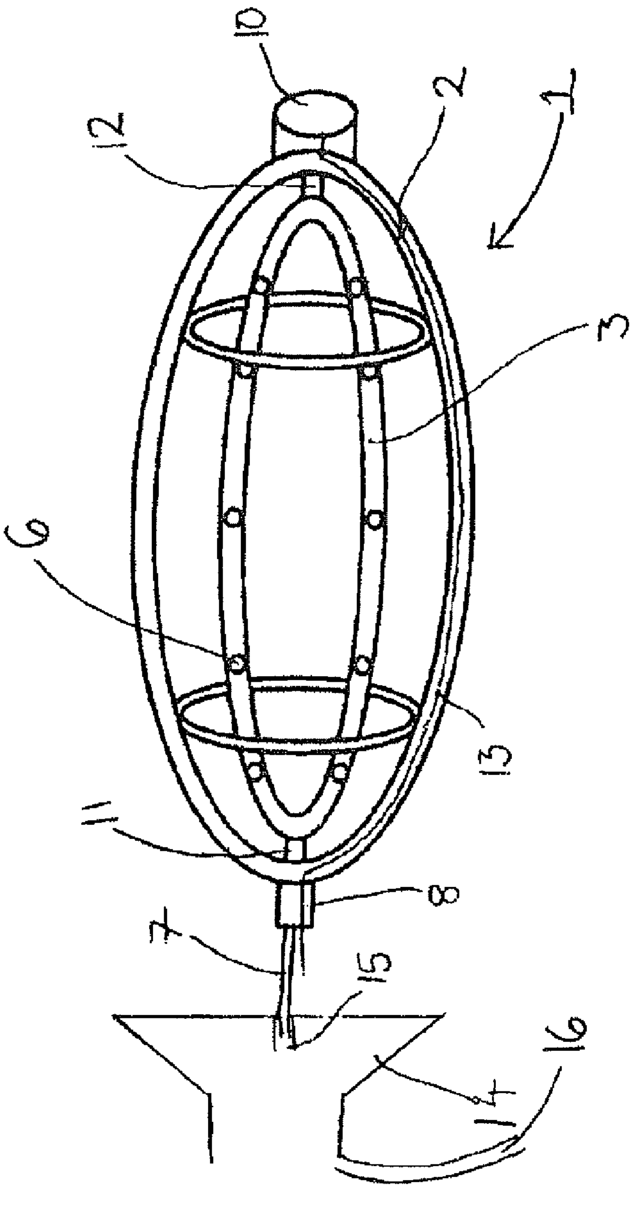
FIG. 1 shows a diagrammatic side view of the air jetting tool.
Figure 2:
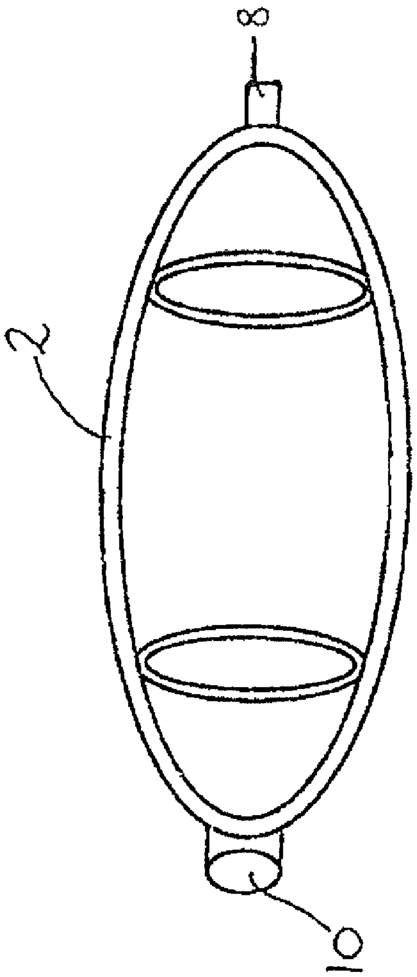
FIG. 2 shows a diagrammatic side view of the outermost portion of the air jetting tool of FIG. 1.

FIG. 1 shows a side view of a first embodiment of a cleaning device 1. This view shows both the outer frame 2 and a conduit 3 mounted for rotation to the frame of the device 1. In a preferred embodiment the conduit 3 is in the form of a ring, as shown and in a further preferred embodiment the ring of the conduit 3 is formed in an elliptical shape. The elliptical ring shape of the rotatable conduit 3 allows for efficient rotation as well as efficient travel of the device 1 into a pipe due to the streamlined shape. However, it is envisioned that that the conduit may be any suitable shape.

In a preferred embodiment the air enters the conduit ring via an inlet at the in-use rear end of the conduit 3. Air can be supplied from an external compressed air supply (not shown). FIG. 1 shows an air supply hose 7 which attaches to the device via a threaded hose connection 8.

The conduit 3 is capable of rotating at various speeds, the speed of rotation dependent on the pressure of the air supplied.

In order to protect the conduit 3 and also to support the conduit in spaced relationship from the pipe as the conduits rotate, an outer frame 2 is provided. The outer frame 2 is of a lightweight construction made of durable materials, such as a plastics material, for example a polyamide such as nylon or an aramid.

The outer frame 2 enables the rotation to occur by providing a rigid structure in which the conduit 3 may rotate. The conduit 3 comprises a plurality of apertures which function as air jetting nozzles 6. The nozzles 6 are angled so as to produce rotation of the ring when the supplied air is forced though the nozzles 6. The power of the air exiting the nozzles 6 causes an opposite force, pushing the conduit 3 in the opposite direction. At the same time the air flow causes debris to be blown in the desired direction.

Figure 3:
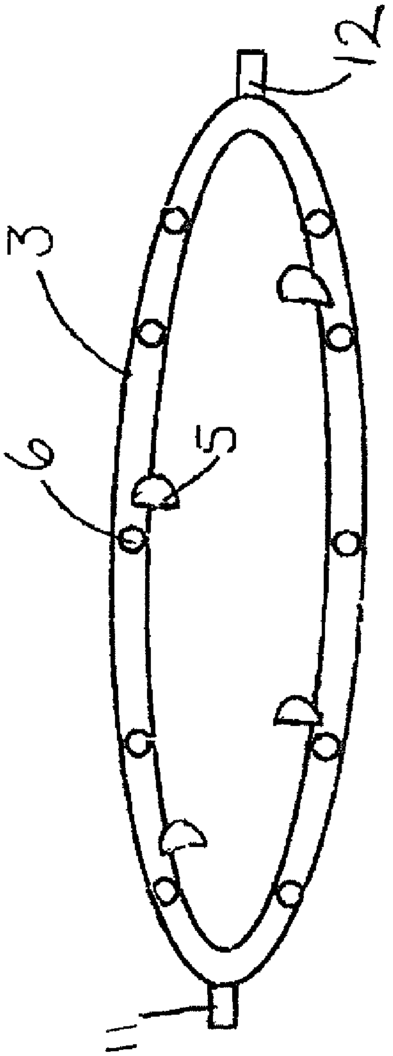
FIG. 3 shows a side view of the inner conduit ring of the air jetting tool of FIG. 1.
Figure 4A:
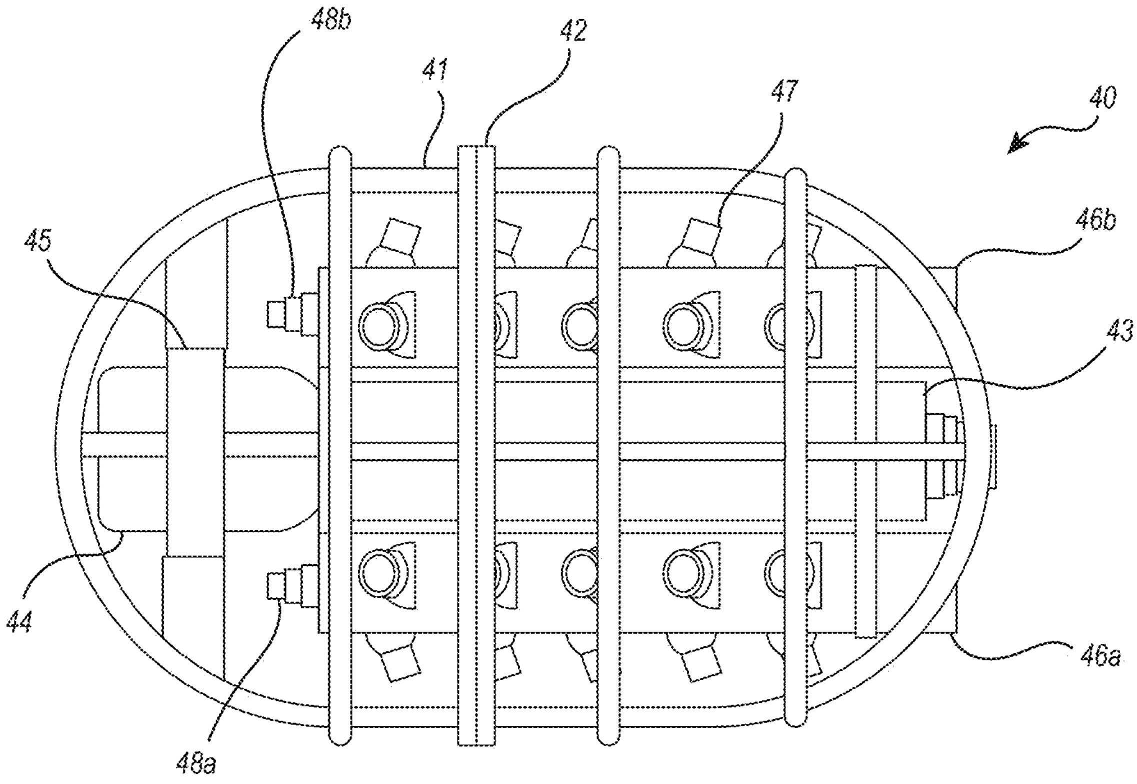
FIGS. 4*a*-4*d* illustrate respectively, a top, perspective, side and rear view of a second embodiment of an air jetting tool.
Figure 4B:
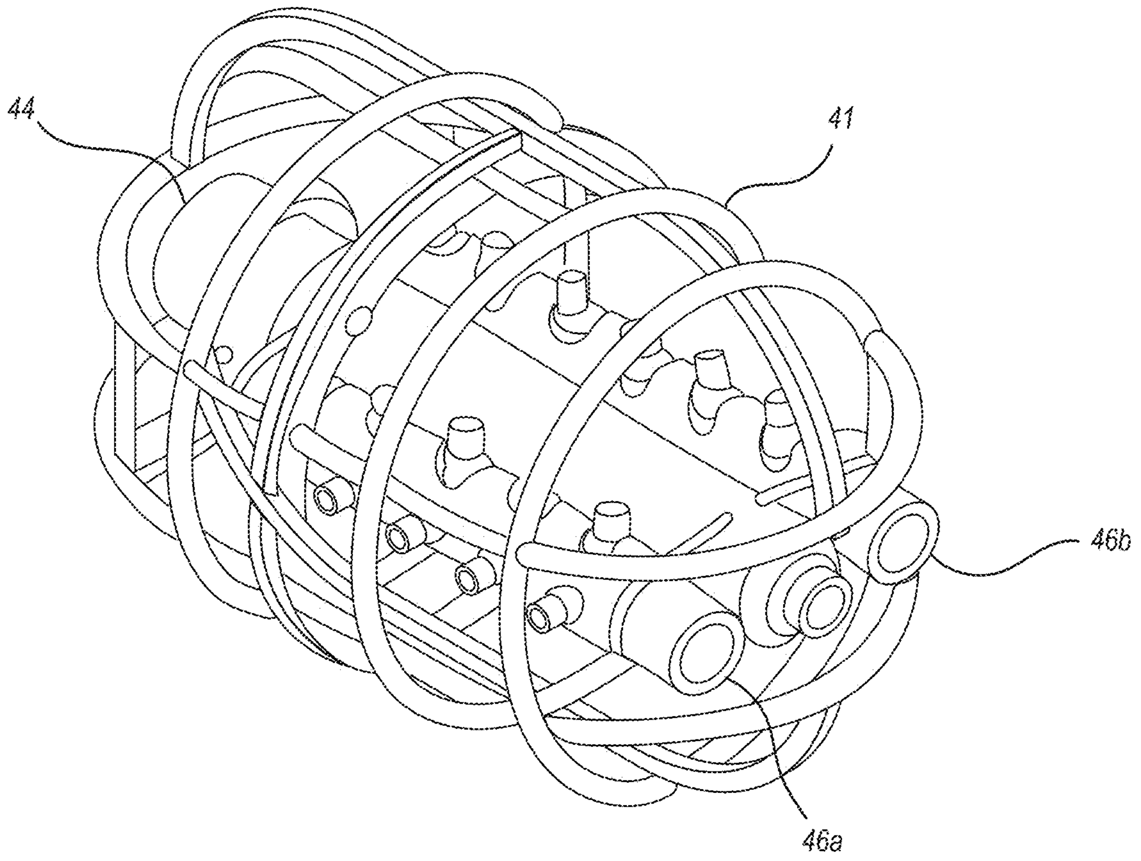
Figure 4C:
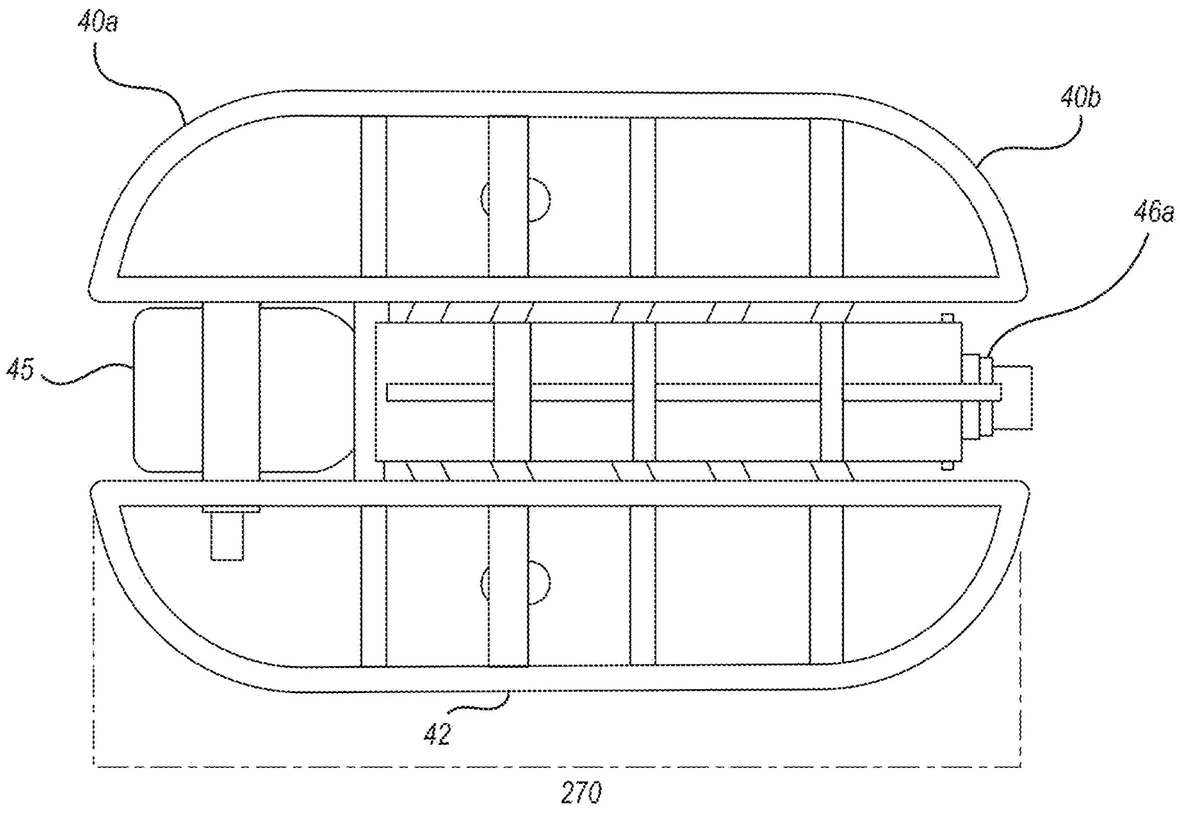
Figure 4D:
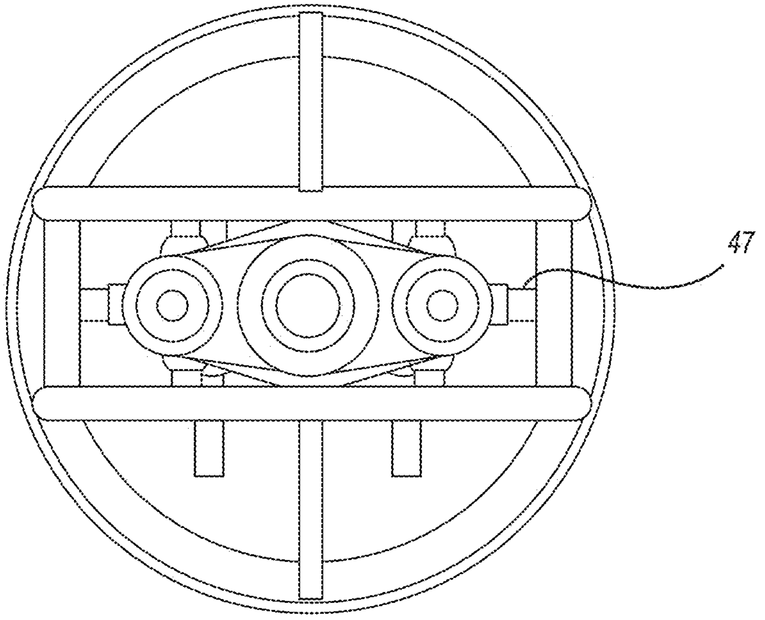

In an optional embodiment, as shown in FIG. 3, the device includes fins 5. Direction of the air from a nozzle 6 causes therefore impact of the air against the fin 5 and acts to increase the force applied to cause the rotation of the conduit 3 in use.

The conduit 3 is connected to the outer frame 2 by means of two rotational joints 11, 12 which allows rotation of the conduit 3 within the outer frame 2.

The elliptical shape of the conduit 3 is ideal for maximum rotation although it should be appreciated that embodiments with alternative ring shapes are possible.

Situated on the opposite end from the air supply and air supply hose 7 is an inspection camera 10. The camera 10 is preferably waterproof, high resolution, lightweight and controlled remotely including remote charging of the battery. It is envisioned that any suitable camera may be used in combination with the device 1 depending on the required use for example the size of the pipe to be cleaned. A smaller pipe diameter may require a smaller size of camera with a higher resolution. The camera 10 can be connected to a external screen for monitoring and the location of the camera 10 allows a cleanliness inspection of the pipe to be carried out both before and after supplying the air.

FIG. 1 shows an embodiment whereby the camera 10 is connected to a power source and a monitor via a power supply cable 13.

For use, to collect debris exiting the pipe, then there is situated at the pipe entrance a cone-shaped screen 14 which surrounds the pipe opening and enables collection of said debris and water, blown by the air jetting nozzles 6. An aperture 15 within the screen 14 allows for movement of the hose with the air supply hose 7. In a preferred embodiment the screen 14 includes a drainage hose 16 connected to a containment tank (not shown). As shown in FIG. 1, the drainage hose 16 is situated at the lowest point of the screen 14.

In use, in the preferred embodiment the device 1 works by using an air supply of ideally between 5 to 10 bar, supplied via a drying unit comprising an air supply hose 7 linked to an air compressor (not shown). The air supply hose 7 is connected to the device 1 via a threaded hose connection 8.

The device 1 is initially inserted into the pipe with the camera 10 at the forward-facing end of the outer frame 2. During the insertion of the device, the camera 10 is able to record and capture images of the pipe interior prior to cleaning. Once inserted, the air supply may be switched on. As the air flows through the conduit 3, air is forced out of the angled nozzles 6. This action will create a force on the conduit 3, causing the conduit 3 to rotate about the rotational connection joints 11,12 within the outer frame 2, which remains secure on the base of the pipe. The constant flow of air enables a consistent high-speed rotation of the conduit 3. This flow of air simultaneously acts to blow any debris, particles or fragments towards the pipe entrance. As the device 1 is subsequently extracted from the pipe in the direction of the entrance, all water and debris is back-blown to the entrance of the pipe to be collected by the cone-shaped screen 14 and removed via a drainage hose 16 into a containment tank for removal.

In an alternative embodiment, the outer frame comprises a number of extending portions which engage the lower inner walls of the pipe and act to raise the device 1 from the base of a pipe. This enables the collected debris to be blown towards the pipe entrance for collection by drainage hose 16, without the collection of debris being interrupted by the device 1 itself. Preferably the device 1 includes two extending portions at a relative angle to one another of greater than 10° and preferably from 10-40°, the angle being chosen such that it acts to raise the device 1 from the base of the pipe.

Additionally, the several nozzles 6 where are directed towards fins 5 will increase the force and speed of the rotation.

In a preferred embodiment, it is envisioned that the entire pipe cleaning process may be controlled remotely if necessary, including remote or automated control of insertion and extraction of the device 1 into the pipe, switching on and off of the air supply, and visualisation and recording of the pipe interior both prior to and post the cleaning.

The outer centralising frame can be manufactured to allow an inspection camera to be incorporated into the tip of the outer frame 2, this would then allow a cleanliness inspection to be carried out pre-cleaning (pre-air supply) and also post-cleaning when the device 1 is removed from the pipe and the air supply.

The dimensions of the outer frame 2 and of the conduit 3 are selected dependent on the bore size of the pipe being cleaned. Typically, the device 1 herein contemplated can be used to clean pipework ranging from 2 to 60 inches (5-155 cm) in diameter.

In an alternative embodiment, the rotating conduit 3 has a cylindrical, rectangular, square, circular, spherical, triangular or other shape to suit the use.

As indicated previously the outer frame 2 of the device 1 is manufactured from, for example, either a durable plastic or a stainless steel. Additionally, a lightweight metal covered in either Teflon® or other plastics coating are also a possible option.

In alternative embodiments the air is supplied via any suitable means.

In an alternative embodiment, the camera itself is not waterproof but instead is housed in an entirely waterproof casing.

It is envisioned that the device 1 is not exclusively to be used for pipe cleaning and can be used for other similar functions including air condition units and devices requiring a supply of air.

Referring now to FIGS. 4*a*-4*d*, these illustrate an alternative pipe-cleaning device in accordance with the currently claimed scope of the invention. The device, generally referenced 40, comprises an outer frame structure, which acts to support and protect a conduit and other components held within the outer frame structure. The outer frame structure is formed in two sections 40*a*, 40*b*, with the main elements 41 formed of 8 mm diameter tubing, either formed from a durable plastics material such as nylon or an aramid, or from a metal or alloy such as steel. The two sections 40*a*, 40*b* are bolted together by a flange arrangement 42. The device illustrated has a generally lozenge shape of circular cross-section, as shown most clearly in FIG. 4*d*.

Along the main axis of the device 40 is arrayed a housing 43 for a camera head 44. The camera head 44 is orientated generally towards the front of the device 40 to enable a user to determine the state of the pipe being cleaned and allow the device 40 to be deployed effectively. As the device 40 generally operates in pipes having a circular cross-section, a gyroscope is included in the camera head 44 to enable the user to determine the orientation of the device 40 within a pipe and so operate the device 40 accordingly. In order to ensure that the camera head 44 remains in the same position relative to the frame structure, a clamp 45 is provided to secure the camera head 44. Cabling, typically a semi-rigid cable, to transmit images from the camera head 44 to an operator can be housed within the housing 43. The cabling which is, for example, a fibre-optic cable can therefore be protected from damage from debris within the pipe.

To enable the device 40 to be pushed into a pipe, a connection point can be included enabling a rod or the like to be connected and used to push the device 40. This obviates the need and temptation for a user to utilise the camera cable for this purpose.

Fixedly secured to each side of the housing 43 are hollow tubular conduits 46*a*, 46*b*. The conduits 46*a*, 46*b* each have generally radially arrayed nozzles 47 secured to the outer surface thereof, each nozzle being in fluid communication with the interior volume of the conduit to which it is secured. A compressed-air supply (not shown) is connected to each of the conduits 46*a*, 46*b*. The compressed air therefore enters into the hollow conduit 46*a*, 46*b* and then exits via the nozzles 47. The jet of air thus produced through a nozzle acts to displace any loose objects within the pipe. In order to drive any such objects out of the pipe and towards the direction from which the device 40 has entered the pipe, the nozzles 47 are angled with respect to the device. It has been surprisingly found that if the nozzles are orientated in the radial plane then this tends to cause material in the pipe simply to swirl around in a chaotic manner rather than in the directional manner of the angled nozzles. As can be seen from FIGS. 4*a* and 4*c* in particular, the nozzles 47 are angled towards the rear of the device 40. Typical angles are from 10-45° to the radial plane of the conduit 46*a*, 46*b*.

A further nozzle 48*a*, 48*b* is optionally included, attached in a forward-facing direction, to each of the conduits 46*a*, 46*b*. The nozzles 48*a*, 48*b* act to drive material away from, for example an end wall of the pipe, which might otherwise be difficult to dislodge. A further optional nozzle(s) can be included specifically directed at the lens of the camera to maintain a clear view for the camera. In a further embodiment, not illustrated, forward-facing one or more forward facing nozzles can be included, which are orientated at an oblique angle to the conduit axis to facilitate movement of material lying to the side of the device. In a still further embodiment, the orientation of a nozzle can be adjusted, advantageously remotely, to allow the air-jet direction to be directed optimally.

Figure 5:
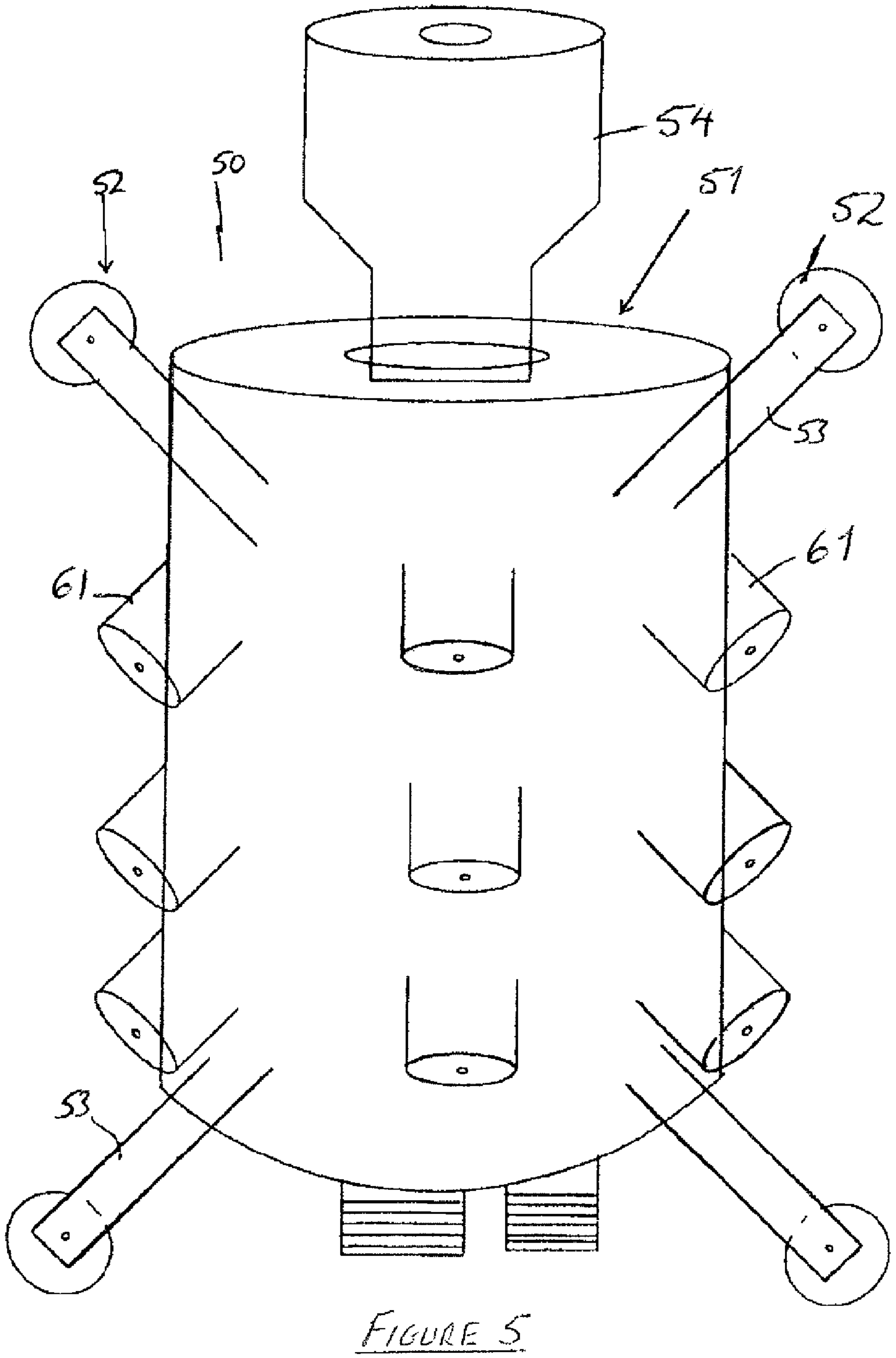
FIG. 5 is a diagrammatic illustration of a third embodiment of an air-jetting tool.
Figure 6:
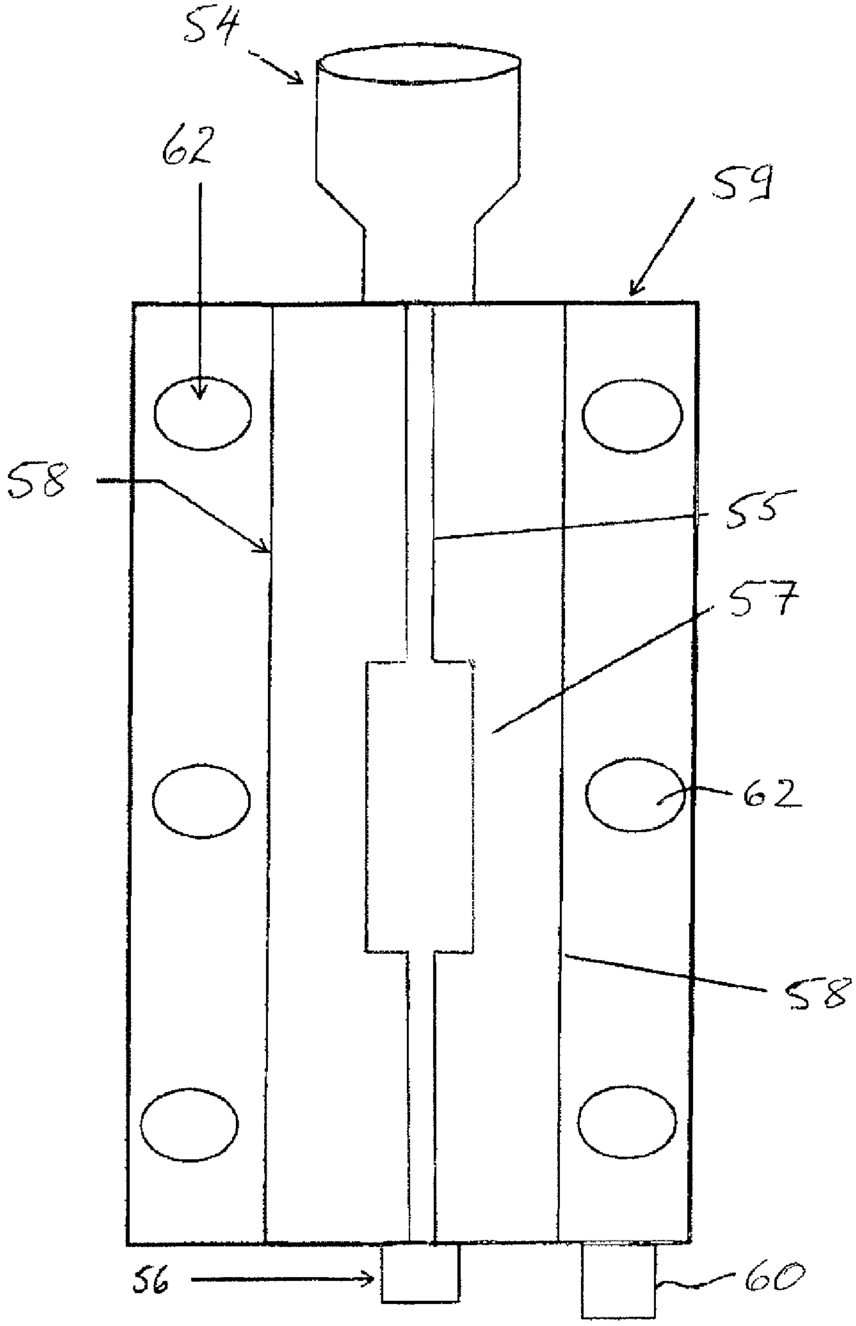
FIG. 6 is a section through the embodiment of FIG. 5 along A-A.

FIGS. 5 and 6 illustrate a further embodiment of pipe cleaning device in accordance with the current invention. The device 50 has an air manifold body 51 which provides support for other elements of the device 50 and can also protect some of the elements from abrasion or other potential damage. The body 51 as illustrated is generally cylindrical and typically a circular right cylinder although other shapes can be utilised, such as triangular, square, hexagonal or octagonal.

Preferred are shapes of body which allow the device 50 to function in different orientations, as for example these having a plane of symmetry. The body 51 should be made of a durable material such as stainless steel, carbon steel, titanium, carbon fibre or a plastics material. In order to stabilise and facilitate movement of the device 50 within pipework or spools, the device is mounted on wheels 52 attached to the body 51 by supporting legs 53. A set of four legs 53 and wheels 52 is shown in FIG. 5, with a further set on the opposite side of the body 51. Optionally a motor is provided to drive the wheels or at least some of the wheels to move the device along a pipe. Control for the motor can be carried out by a user external to the pipe using a control device connected to the motor, either via a cable or wireless connection. This allows the device to be usable in multiple orientations. It will be appreciated that other numbers and configurations of legs can also be utilised. For example, two sets of three legs, one set at either end of the device can be provided, the legs being spaced at around 120° from each other around the main device axis. The legs 53 each extend an equal distance from the body 51 which helps in stabilising the device 50 within a pipe, in the lowermost regions, the exact height depending on the length of the legs and the angle of the legs relative to a plane of the body 51. The angle and length of the legs 53 can therefore be adjustable using suitable joints known in the art.

At the front of the device 50 is a camera head 54, to house a camera, to enable images of the inside of the object being cleaned to be made and to be relayed via the cable 55 to a user. The user is thus aware of the status of the cleaning operation within the object and can move the device 50 accordingly. Power for the camera is provided via the connection 56. In order to protect the camera cable 55 and the camera capacitor 57, a housing 58 is provided within the body 51, which surrounds and provides added protection for the cable 55 and capacitor 57. In one embodiment, the housing 58 is removably mounted for rapid replacement of the camera in the event of breakage, thereby reducing downtime.

Deployed around the outside of the housing 58 are one or more airways 59, supplied with compressed air, to supply dry, oil-free air at a pressure of up to 10 bar, via the air supply connector 60. In one alternative, the airway 59 is annular, deployed around a cylindrical housing 58 which allows simpler connectivity between the pressurised air supply and the device. The or each airway is in fluid connection with the nozzles 61 via holes 62 in the airways 59. The nozzles 61 are arrayed around the outside of the body 51, and as illustrated are orientated away from the camera or front end of the device. It will be appreciated therefore that as the device 50 is normally inserted into the object to be cleaned with the camera at the front, to provide a view inside the object, the action of air blowing out of the nozzles 61 will be to blow debris or water out of the object in the direction from which the device is inserted. The action of the device therefore is to clean the object by blowing contaminants out of the object.

Figure 7:
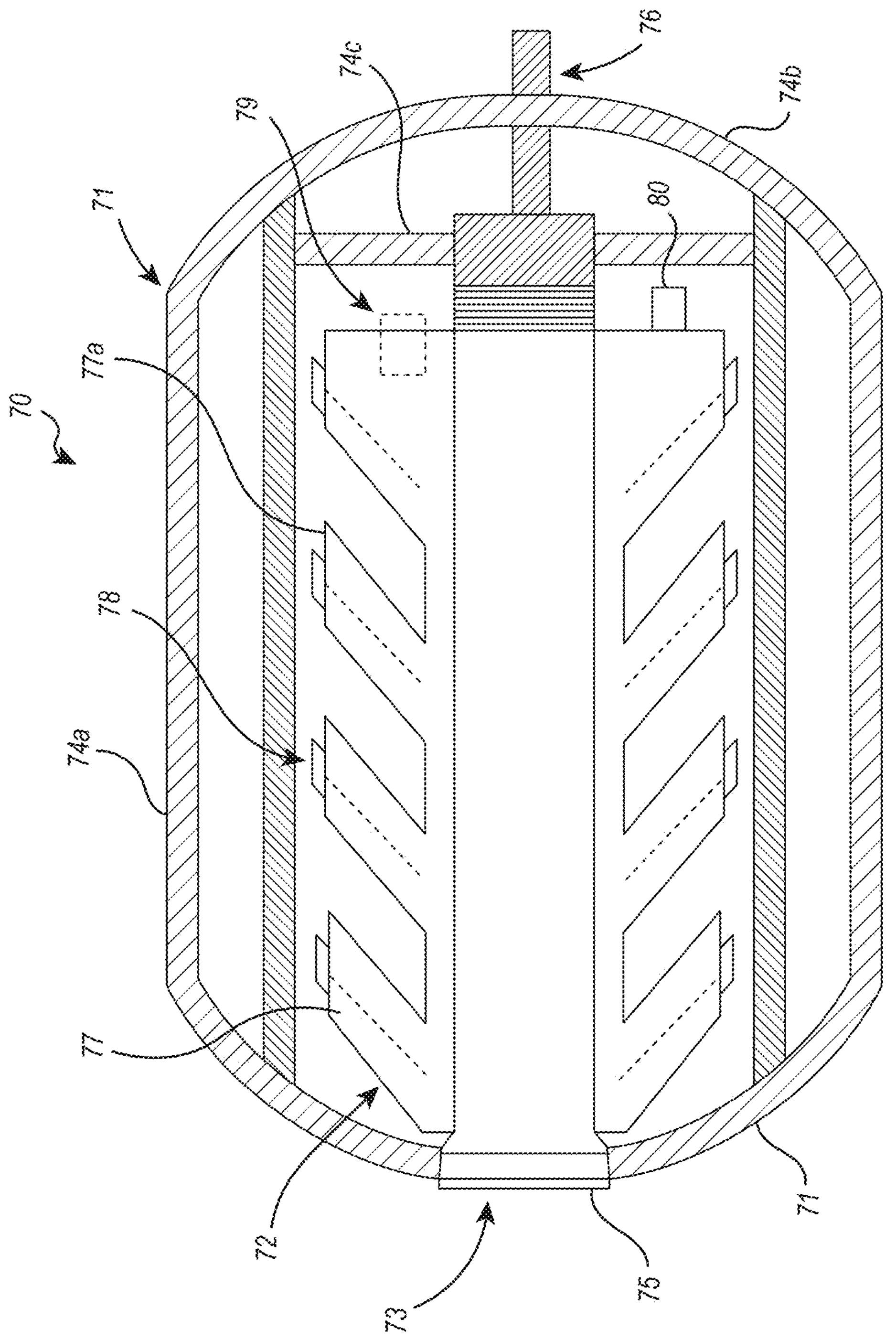
FIG. 7 is a diagrammatic illustration of a fourth embodiment of an air-jetting tool.

Referring to FIG. 7, this shows a fourth embodiment of a device 70. The device 70 has a centraliser frame 71 supporting an air manifold 72 and a camera support 73. The centraliser frame 71 is formed of a plurality of tubular members 74*a-c*, secured together typically by means of a welded seam or other means known in the art. At the in-use front end of the device 70, is mounted a camera 75 connected to a cable 76, allowing images from within the pipework being cleaned to be obtained and transmitted. The air manifold 72 comprises rearward facing sections 77, having at their free ends 77*a* an air jet or nozzle 78. In order to receive compressed air into the manifold, an air hose connection 79 is provided. Additionally, a connector 80 to receive a pushrod is provided, to facilitate movement of the device in and out of the pipe or spool work.

The device as herein described allows a considerable amount of time and costs to be saved the construction of a clean piping system in that it enables the system to be built in a clean manner. This is in contract to current practice within industry.

In summary, an exemplary embodiment of the process involves firstly reviewing piping isometric drawings and introducing hold points into the piping where cleaning and inspection can take place.

Spools are lifted into place and positioned on pipe stands. Adjacent spool pieces are then offered up and tacked in place with bullets to supply even space for welding. A root pass weld is then applied between bullets.

The first bullet is removed with a grinder and the edge of the first weld ground to present leading edge of second weld. The above two stages are repeated until the weld is complete, and then the above stages are repeated until a designated critical cleanliness hold point is reached.

An air jet device as described above is inserted to remove spool construction debris, internally dry spool run and complete internal pipe inspection. An internal corrosion inhibitor can be applied if desired.

These stages are repeated at every critical cleanliness hold point until the system is fully constructed. Once this is achieved, system or part system hydro tests are commenced.

The completed system or part system is tested to check that it is de-watered. Part system or system hydro tested has previously had spool construction debris removed, corrosion inhibitor applied and undergone 100% inspection record signed off by the assigned engineer and client. Any water pockets in the system no longer cause oxidation due to any corrosion inhibitor. The system can be handed over to start up teams without any subsequent rework costs or time delays being required.

The hold points that work hand in hand with the air jet device, allow the process to be used to methodically clean, dry and inspect internal piping process systems and pipelines. Moreover, without the use of the device the hold point process would be irrelevant as it would serve no process in the procedure of pipeline and piping system construction.

On an agreed “hold point” being reached, the air tool is inserted internally into the pipework and pushed forward until it reaches the then end of the piping run, once this stage is complete a debris collection cone is attached to the entry/exit point of the spool. The camera is operated during this stage to conduct a pre-clean or “Dirty Inspection” and also to show the operators when the air tool has reached its destination point. Once the tool has reached the destination point the air compressor that supplies the device with its compressed air supply is switched on and pressure increased gradually to around 8 bar. The device is retrieved slowly at a constant rate. During retrieval, the camera operator views the screen to guide the device operator on retrieval speed. On approaching the entry/exit point of the piping spool run, the device is pulled toward the debris collection cone screen, forcing the debris to collect inside the cone. If the device is being used for drying also, the above stages are repeated until the spool is internally dry as shown on the video footage obtained from the camera.

The invention claimed is:

1. A device for cleaning the internal surface of a pipe having a main pipe axis, the device comprising:

a cage having a front end and an opposing rear end;

a tubular housing disposed within the cage and extending between a front end and an opposing rear end;

a plurality of tubular conduits each having a front end and an opposing rear end and each being disposed within the cage so as to be laterally spaced apart from the housing, each of the plurality of tubular conduits having an encircling conduit wall with an outside face extending between the front end and the rear end thereof, an inlet being disposed on each tubular conduit to receive a pressurized gas;

a plurality of nozzles being spaced apart along the outside face of each tubular conduit so as to be in fluid communication with the tubular conduit, each of the plurality of nozzles being sloped toward the rear end of the cage so as to be disposed at an angle in a range between 10° and 45° relative to the tubular conduit on which the plurality of nozzles are disposed;

a camera head disposed on the front end of the housing; and a further nozzle being disposed on and in fluid connection with each of the plurality of tubular conduits, the further nozzle of each of the plurality of tubular conduits facing forward toward the front end of the cage so that when the pressurized gas passes out through the further nozzle of each of the plurality of tubular conduits, the pressurized gas passes forward of the front end of the cage, the further nozzle of each of the plurality of tubular conduits being spaced apart from the housing and the camera head.

2. The device according to claim 1, wherein the plurality of tubular conduits are rotatable relative to the cage.

3. The device according to claim 1, wherein each of the plurality of nozzles and each of the further nozzles are coupled with the tubular conduits so that when the pressurized gas is received within the tubular conduits, the pressurized gas flows out of each of the plurality of nozzles and each of the further nozzles.

4. A device for cleaning the internal surface of a pipe having a main pipe axis, the device comprising:

a body having a front end that terminates at a front end face, an opposing rear end that terminates at a rear end face, and an encircling side face that extends between the front end face and the rear end face, the body having a central longitudinal axis extending between the front end face and the rear end face;

a plurality of nozzles disposed on the side face so as to be spaced apart from the front end face and the rear end face, each of the plurality of nozzles being radially spaced apart around the body on the side face, each of the plurality of nozzles being sloped at an acute angle relative to the central longitudinal axis so as to face rearwardly away from the front end face;

a conduit passing through the body from an inlet formed on the rear end face to each of the plurality of nozzles, the conduit being configured so that a pressured fluid fed into the inlet, passes out of the body through each of the plurality of nozzles;

a camera head outwardly projecting from the front end face of the body so as to extend forward of the front end face;

a first plurality of legs outwardly projecting from the body at radially spaced apart positions about the body and extending forward of the front end face of the body;

a corresponding first wheel being rotatably mounted on each of the first plurality of legs, at least a portion of the camera head and each first wheel being disposed in a first plane that extends orthogonal to the central longitudinal axis of the body and is disposed forward of the front end face of the body;

a second plurality of legs outwardly projecting from the body at radially spaced apart positions about the body and extending rearward of the rear end face of the body; and a corresponding second wheel being rotatably mounted on each of the second plurality of legs, at least a portion of each second wheel being disposed in a third plane that extends orthogonal to the central longitudinal axis of the body and is disposed rearward of the rear end face of the body, wherein the plurality of nozzles are disposed between the first wheels and the second wheels.

5. The device as recited in claim 4, wherein the device is free of any nozzles disposed on the rear end face of the body or rearward of the rear end face.

6. The device as recited in claim 4, wherein the body has cylindrical configuration.

7. The device as recited in claim 4, wherein the first plurality of legs and the second plurality of legs are each disposed on and outwardly project from the encircling side face of the body.

8. The device as recited in claim 4, further comprising a source for delivering a pressurized gas being fluid coupled to the inlet formed on the rear end face of the body.

9. The device according to claim 4, wherein the camera head is connected via a data cable to a data receiver, and a power source via a power cable.

10. The device according to claim 9, wherein the device includes a capacitor deployed between the power source and the camera head.

11. The device according to claim 4, wherein each of the plurality of nozzles is fluidly linked to an air supply.

12. The device according to claim 4, wherein the camera head is disposed forward of the front end of the body so that all of the plurality of nozzles are rearward of the camera head.

* * * * *